(12) United States Patent
Morrish

(10) Patent No.: US 6,327,193 B1
(45) Date of Patent: Dec. 4, 2001

(54) MIXED SIGNAL METHOD FOR DISPLAY DEFLECTION SIGNAL GENERATION FOR LOW COST DISPLAYS

(75) Inventor: Andy Morrish, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/670,215

(22) Filed: Sep. 25, 2000

(51) Int. Cl.[7] ............................................. G11C 7/00
(52) U.S. Cl. ............................. 365/189.08; 365/230.06
(58) Field of Search ....................... 365/189.01, 189.08, 365/230.01, 230.06

(56) References Cited

U.S. PATENT DOCUMENTS 5,511,032  *  4/1996  Kammerer ................. 365/230.06
5,787,457  *  7/1998  Miller et al. ................ 365/230.06

* cited by examiner

*Primary Examiner*—Terrell W. Fears
(74) *Attorney, Agent, or Firm*—Merchant & Gould PC

(57) ABSTRACT

Vertical rate deflection signals are generated using a combination of digital and analog techniques. A signal is generated by a switched capacitor type accumulator circuit, a wave shape control circuit, and a DC signal centering circuit. The signal is periodically reset by initializing a first storage circuit in the accumulator circuit to an initial start voltage. A buffer couples the first storage circuit to a first signal output. A second signal output is produced by generating a controlled offset from the first signal output. The second signal output is sampled by a second storage circuit, and subsequently coupled to the first storage circuit. The amplitude and slope of the signal are determined by the controlled offset level. The wave shape control circuit dynamically controls the offset level. By varying the offset level, the waveform shape is adjusted to provide a linear ramp, S corrected ramp, EWPCC parabolic signal or the like. A look up table, multiplier and/or a DAC may be used with a controlled source to provide the controlled offset level. The output waveform is centered about a DC level by the signal centering circuit. The signal centering circuit samples the first signal output at half of the period of the vertical retrace signal, and subtracts the first signal output from the sampled signal to maintain an DC signal level for the ramp signal. The present invention provides for an economical, efficient, and simple method for generating vertical rate deflection signals.

25 Claims, 8 Drawing Sheets

MIXED SIGNAL METHOD FOR DISPLAY DEFLECTION SIGNAL GENERATION FOR LOW COST DISPLAYS

FIELD OF THE INVENTION

The present invention relates to a method and apparatus for generating video deflection signals for low cost display systems. In particular, the present invention relates to a method and apparatus that utilizes capacitive charge switching to generate vertical rate deflection signals in a low cost video display system.

BACKGROUND OF THE INVENTION

Typical video display systems use analog techniques to create a vertical deflection signal. In a cathode ray tube (CRT) display, the CRT has a phosphor screen located opposite an electron gun. The electron gun emits electrons, which are accelerated and focused on the phosphor screen by a high voltage grid. The phosphor has a luminance that will only last for a short time interval, and hence the screen must be periodically refreshed to retain an image. Conventional monitors typically refresh the phosphor screen at 60 Hz.

An image is displayed on a phosphor screen using a raster scan technique. The screen is divided up into a number of horizontal scan-lines. At the beginning of displaying a new image, the electron gun is positioned at the upper left corner of the screen at the first scan-line. For each scan-line, the electron beam is steered horizontally (left to right) across the screen at a fixed frequency. When the electron gun reached the right edge of the screen, the electron gun must return back to the left side of the screen (termed the horizontal retrace). During horizontal retrace, the electron beam is steered (right to left) to the left edge of the next scan-line immediately beneath the preceding scan-line. Once all scan-lines are traced by the electron gun, the beam is steered back to the top left corner of the screen during the vertical retrace interval. As described above, a CRT with a raster scan display screen requires the electron beam to be steered horizontally across the screen, and vertically across the screen for both the horizontal retrace interval and the vertical retrace interval. A horizontal deflection circuit is used to steer the beam horizontally, while a vertical deflection circuit steers the beam vertically. The horizontal and vertical deflection circuits produce high voltage signals. The high voltage signals are used to activate deflection coils, which steer the electron beam horizontally and vertically.

Typical vertical deflection circuits include a vertical oscillator circuit and vertical deflection coils. A composite video signal is coupled into the vertical deflection circuits. The composite video signal has horizontal and vertical sync pulses embedded in the signal. The vertical sync pulses in the composite signal are used to trigger the vertical oscillator so that the vertical oscillator locks to a frequency of 60 Hz. The vertical oscillator generates a 60 Hz saw tooth waveform. The saw tooth waveform is used to generate a current ramp to drive the vertical deflection coils. The current ramp drives the vertical deflection coils such that the electron beam moves from the top of the screen to the bottom of the screen at a uniform rate. At the end of the current ramp, the deflection coils are deactivated and the electron beam returns to the top of the screen.

Other circuits within a CRT display using vertical rate waveforms may use parabolic shape waveforms. Such circuits correct for parabolic errors that arise due to the geometry of the CRT, distortions in the deflection coils, and the variation in focus voltage between the center and the top and bottom of the screen. A parabolic waveform may be used to modulate the amplitude of the horizontal rate scan, in order that vertical lines portrayed on the screen appear as straight. Similarly, the focus voltage applied to the CRT focus electrode often needs to be modulated with a parabolic waveform in order to adjust the focal point of the electron beam as the beam scans from top through center to the bottom of the screen.

SUMMARY OF THE INVENTION

In accordance with the invention, the above and other problems are solved by an apparatus for generating deflection rate signals. Briefly stated, the present invention provides for a signal generator system that uses a combination of digital and analog techniques to generate vertical rate deflection signals for a display system. The vertical deflection signal is generated by a switched capacitor type accumulator circuit, a wave shape control circuit, and DC signal centering circuit. The signal is periodically reset by initializing the first storage circuit in the accumulator circuit to an initial start voltage. A buffer couples the first storage circuit to a first signal output. A second signal output is produced by generating a controlled offset from the first signal output.

The second signal output is sampled by a second storage circuit, and subsequently coupled to the first storage circuit. The amplitude of the signal and the slope of the signal are both determined based upon the controlled offset level. The wave shape control circuit dynamically controls the variations in the offset level. By varying the controlled offset level, the waveform shape may be adjusted to provide a linear ramp, an S corrected ramp, or an EWPCC parabolic signal or the like. A look up table, multiplier and/or a DAC may be used with a controlled source to provide the controlled offset level. The output waveform is centered about a midpoint DC level by the signal centering circuit. The signal centering circuit samples the first signal output at half of the period of the vertical retrace signal, and subtracts the first signal output from the sampled signal to maintain midpoint signal level for the signal. The present invention provides for an economical, efficient, and simple method for generating vertical rate deflection signals.

In accordance with an aspect of the invention, a first sampling circuit is employed to store a first signal. The first signal is coupled to a first output signal. An offset circuit is employed to produce a second output signal, the second output signal being the first output signal with an offset. The second output signal is selectively coupled to a second sampling circuit, the second sampling circuit storing a second signal. The second signal is selectively coupled to the first sampling circuit such that the first signal is periodically changed, and the first output signal results in a controlled ramp signal.

In accordance with a further aspect of the invention, the signal is periodically initialized to a start value by selectively coupling the first sampling circuit to an initial value.

In accordance with yet a further aspect of the invention, a midpoint signal centering circuit is employed to center the signal about a common signal level. A third sampling circuit is employed to selectively store a third signal. The third signal is proportional to the first output signal, and is sampled at a time when the first output signal is halfway through its period. A summing circuit subtracts the first signal from the third signal to produce an output waveform. The output waveform is centered about the midpoint signal level. Also, the output waveform center level may be further adjusted by a controlled source coupled to the summing circuit.

In accordance with an aspect of the invention, an apparatus for generating a signal that periodically resets is provided for. A first storage circuit stores a first signal thereon, the first signal being initialized to a start value at the start of a period. A second storage circuit stores a second signal thereon. A buffer circuit couples the first signal to a signal output. An offset circuit couples the signal output to another signal output such that the signal output is different than the signal output by an amount of offset. A control signal controls the amount of offset. A switch having a first and second position is employed to selectively couple the second storage circuit between two positions, the first position coupling the output signal to the second storage circuit, and the second position coupling the second signal to the first storage circuit. When the second signal is coupled to the first storage circuit, the first signal changes by some amount. Over the period, the changes to the first signal couple to the signal output such that the signal output corresponds to the input signal.

In accordance with other aspects of the invention, the offset circuit includes a current source, the control signal controls the amount of current flowing through the current source, and the amount of current flowing through the current source is proportional to the amount of offset. When the control signal is a constant, a linear ramp output signal results. When the control signal is a bi-direction ramp signal, a parabolic output signal results.

In accordance with another feature of the invention, a look up table and a converter may be employed to provide dynamic control over the amount of offset. The look up table contains values corresponding to a waveform shape. The look up table is coupled to the converter such that the converter produces an output. The output of the converter is coupled to the control signal such that the converter generates the control signal in response to the look up table values. Also, a multiplier circuit may be employed to provide gain control over the look up table values. The gain control results in the converter generating the control signal in response to the look up table values and the gain control. The output signal is shaped by the control signal input such that the output signal may be one of a linear ramp signal, an S corrected ramp signal, an east-west pincushion corrected ramp signal, and a corner correction signal.

According to another feature of the invention, a midpoint voltage centering circuit is employed to center the midpoint DC level of the output signal about a set voltage. The output signal is coupled to a third storage circuit, storing a third signal therein when actuated. A center signal actuates the third storage circuit half way through the period such that the output signal is coupled to the third storage circuit and the third signal corresponds to the midpoint voltage of the signal. A summing circuit is arranged to add the output signal to the third signal to generate the output signal such that the midpoint of the signal is centered about a predetermined voltage. Another current source may be coupled to the summing circuit to provide an average voltage shift adjustment.

According to yet another feature of the invention, a first sampling circuit is employed to store a first signal. The first signal is coupled to a first output signal. An offset circuit is employed to produce a second output signal. The second output signal is the first output signal with a controlled offset. The second output signal is selectively coupled to a second sampling circuit, the second sampling circuit storing a second signal. The second signal is selectively coupled to the first sampling circuit such that the first signal is periodically changed, and the first output signal results in a controlled signal. A converter and a look up table are employed to generate a first control signal for controlled offset. The look up table contains values corresponding to a waveform shape. The look up table is coupled to the input of the converter such that the output of the converter generates the first control signal in response to the look up table values. A summing circuit adds the first control signal to a second control to generate the control signal such that the control signal modulates the amount of the offset in response to the look up table values and the second control signal. When the second control signal is a bidirectional linear ramp, the modulation of the offset results in a parabolic shaped output signal that includes corrections for corner geometries in a display system.

In accordance with an embodiment of the invention, there is provided for a method for generating a ramp or parabolic waveform. According to the method, a first storage circuit is initialized to a start value, and an output of the first storage circuit is buffered to produce a signal output. A second signal output is produced by off setting the signal output by a fixed or variable amount. The second signal output is stored in a second storage circuit to produce a stored signal. The stored signal is coupled to the first storage circuit to produce an output signal corresponding to the required waveform.

In accordance with other aspects of the invention the method for generating a ramp or parabolic waveform, further includes modulating the controlled amount of offset over time such that the waveform has a varying slope. Also, the controlled amount of offset may be varied by employing a look up table. The look up table is accessed to determine a scaling factor for a particular waveform shape. The controlled amount is changed based upon the scaling factor.

In accordance with yet another aspect of the invention, the method for generating a ramp waveform further includes determining the midpoint value of the signal output, and setting the DC level of the waveform based upon the midpoint value of the signal output such that the midpoint DC level of the waveform is maintained for varying amplitudes of the signal output. The midpoint value of the signal may be determined by sampling the signal input when the signal input is halfway through its period to generate a third signal output. A fourth signal output is determined by inverting the output signal. By adding the third and fourth signals together, a waveform results that is centered about its midpoint value.

According to another embodiment of the invention, an apparatus for generating a ramp or parabolic signal includes means for sampling a first signal to generate a first stored value, means for coupling the first stored value to a first output, means for generating a fixed or variable offset between the first output and a second output, and means for sampling the second output to generate a second stored value. Means for selectively coupling the second stored value to the means for sampling a first signal are provided for such that the first stored value changes by an amount corresponding to the offset.

According to a feature of the invention, the apparatus further includes means for initializing the first signal to a start value. Also, means for periodically initializing the first signal to the start value are provided for such that the signal is reset to the start value at the start of a period.

According to another feature of the invention, the apparatus further includes means for dynamically varying the offset such that the ramp or parabolic signal has a non-uniform slope. The amplitude of the dynamic signal may also be adjusted by adjusting the offset. Also, the offset may be dynamically controlled by providing means for dynamically accessing a look up table to produce scaling factors, and means for adjusting the offset based upon the scaling factors.

According to yet another feature of the invention, the apparatus for generating a ramp or parabolic signal further includes means for centering the dynamic signal about a constant midpoint voltage. Also, the means for generating an offset may further include means for modulating the offset such that the dynamic signal is one of an S corrected ramp signal, a corner corrected signal, and a parabolic signal.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE PREFERRED EMBODIMENT

The present invention uses switched capacitor techniques to generate vertical rate deflection signals in a display circuit. The vertical deflection signal generator system includes features such as 'S' correction and East West Pin Cushion Correction (EWPCC). By using mixed digital/analog techniques, the present invention provides for a low cost solution for generating vertical rate deflection waveforms. The present invention is easily integrated onto a single microchip, without needing large external capacitors. The solution provided below is frequency independent and does not require a subsequent amplitude control.

Figure 1:
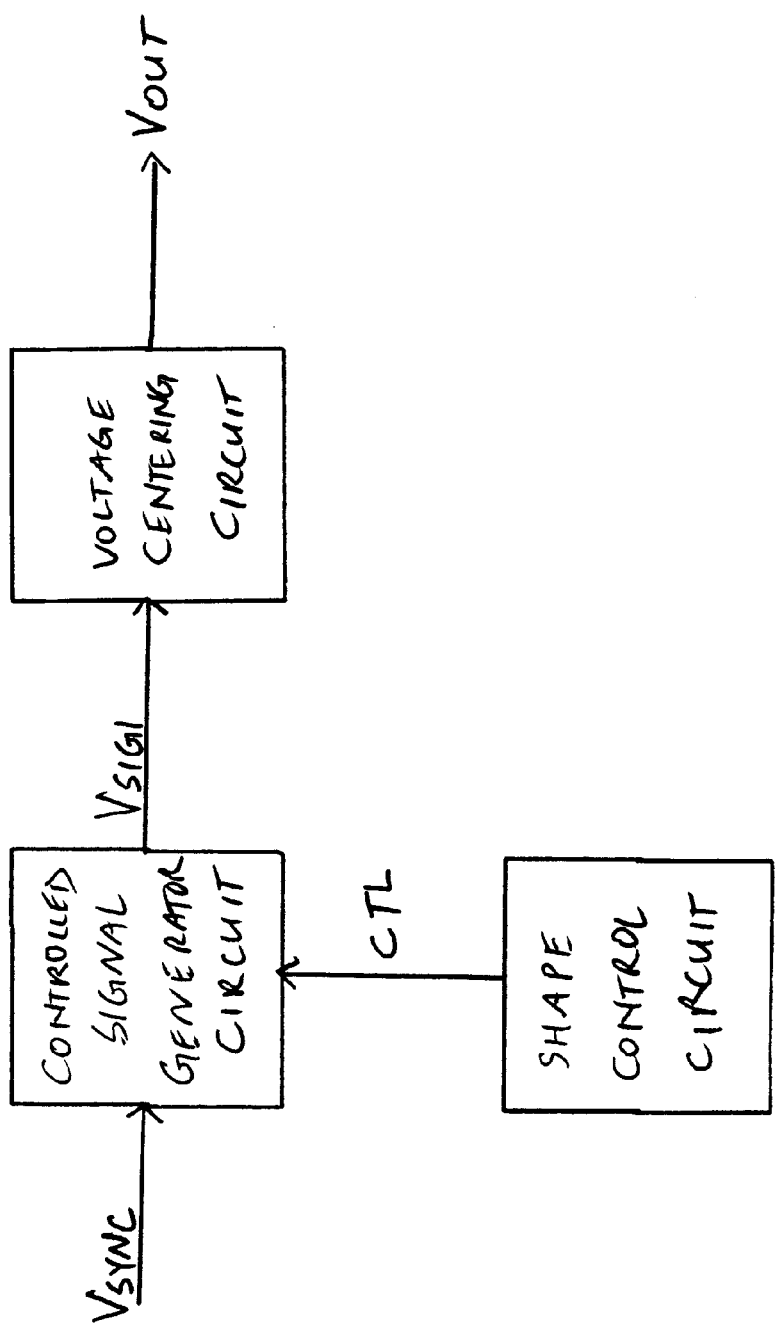
FIG. 1 is a diagram of a vertical deflection signal generator system.

A vertical deflection signal generator system is shown in FIG. 1. A controlled signal generator receives a vertical synchronization pulse ($V_{SYNC}$) at the beginning of each video frame. A shape control circuit outputs a control signal (CTL) corresponding to the desired output signal shape and output signal amplitude of the controlled signal generator. Based upon the control signal, the controlled signal generator will generate a ramp signal that may include S correction, or an EWPCC parabolic waveform, with possible higher order corrections to account for corner geometry correction. The output of the controlled signal generator, including any required shape correction, is coupled to voltage centering circuit. The voltage centering circuit processes the output of the controlled signal generator ($V_{SIGI}$) so that the output signal ($V_{OUT}$) will remain centered at a particular DC voltage when the peak-to-peak amplitude of the signal is varied.

Although FIG. 1 depicts 3 discrete circuits, these circuits may be combined into one or more circuits as is desired. It is understood that in some applications portions of circuits or complete circuits may be eliminated while still providing an adequate solution to a given problem. The operation of each individual circuit shown in FIG. 1 will become apparent by the discussion that follows below.

Figure 2:
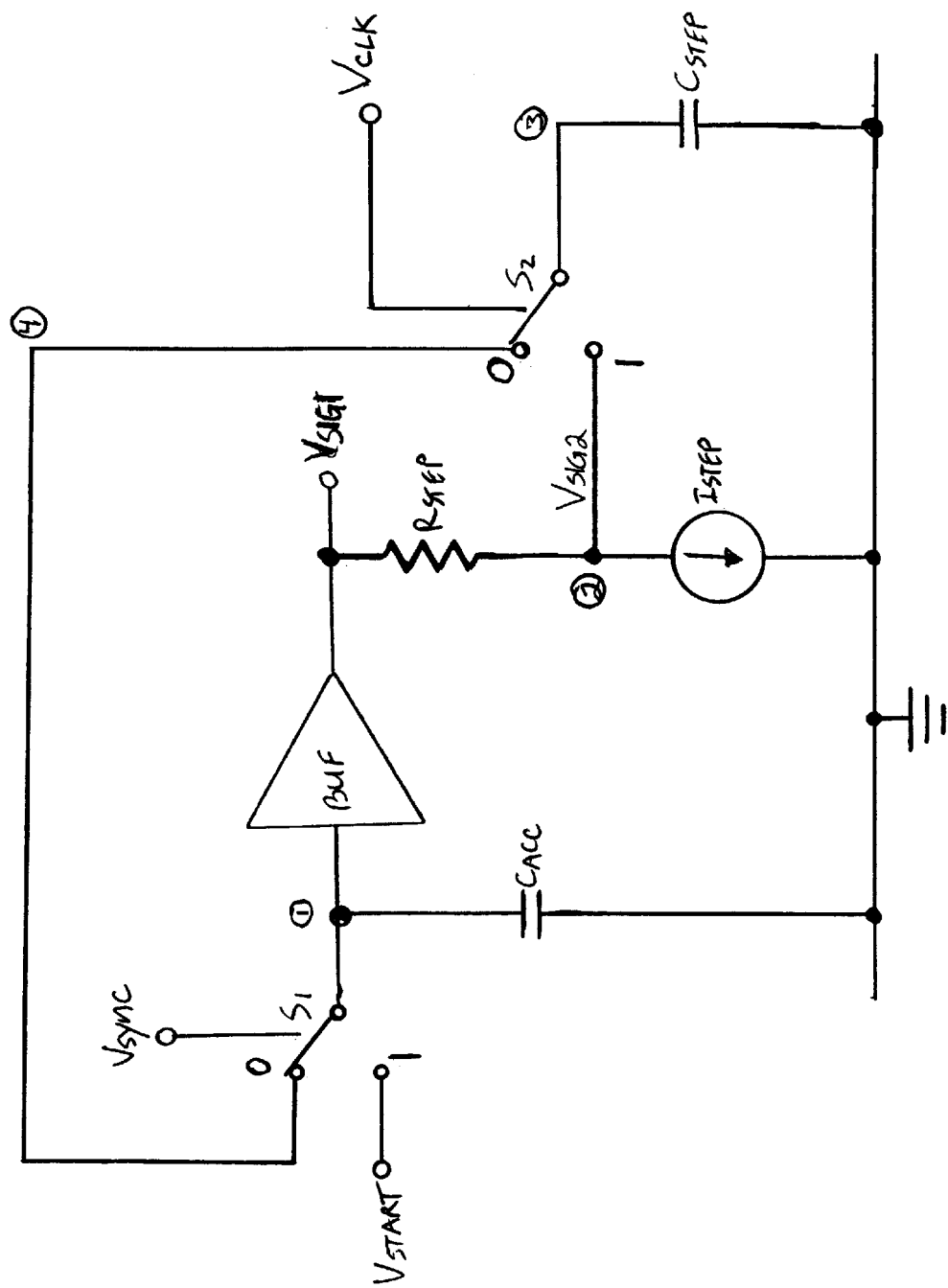
FIG. 2 is a diagram of a switched capacitor type accumulator circuit.

A re-settable accumulator circuit using switched capacitor techniques is shown in FIG. 2. As shown in the figure, an accumulator capacitor (CACC) is coupled between node 1 and a common ground connection (GND). A buffer (BUF) has an input at node 1 and an output at $V_{SIGI}$. A resistor ($R_{STEP}$) and a fixed or variable current source ($I_{STEP}$) are series connected to one another with a common connection at node 2 ($V_{SIG2}$), the resistor side connected to $V_{SIGI}$ and the current source side connected to GND. A capacitor is coupled between node 3 and GND. A first controlled switch ($S_1$) has a common connection at node 1 and is controlled by a signal $V_{SYNC}$. The make side of $S_1$ is coupled to a voltage $V_{START}$, while the break side of the switch is coupled to node 4. A second controlled switch ($S_2$) has a common connection at node 3 and is controlled by signal $V_{CLK}$. Te make side of $S_2$ is coupled to node 2, while the break side of the switch is coupled to node 4.

The buffer (BUF) may be any suitable buffer circuit with a high input impedance, a low output impedance, and a low input referred offset voltage. A high input impedance will prevent the buffer from loading down the accumulator capacitor ($C_{ACC}$), causing the voltage to droop. A suitable operational amplifier (op-amp) may be configured as a unity gain follower to provide the buffer. The buffer may also be configured to have gain when it is desired to scale the input voltage.

Switches $S_1$ and $S_2$ must provide good isolation (high impedances when in the open position) to prevent leaking charge out of the capacitors ($C_{ACC}$, $C_{STEP}$). The switches must also have suitably low on resistance to provide reasonable transient times for transferring charge without voltage loss.

Resistor $R_{STEP}$ and current source $I_{STEP}$ together determine the step voltage ($V_{DEL}=R_{STEP}*I_{STEP}$) for each cycle of $V_{CLK}$. $I_{STEP}$ is a programmable and variable current source that can source or sink current (pushing or pulling current through resistor $R_{STEP}$).

Capacitor $C_{STEP}$ is a small capacitor, which stores the voltage $V_{SIG2}$. The value of $C_{STEP}$ must be suitable to discharge and charge within a small time period less than the pulse width of $V_{CLK}$.

Two periodic signals are required for the circuit to operate ($V_{SYNC}$, $V_{CLK}$). $V_{SYNC}$ generates a short pulse that is synchronized with a vertical sync of a video signal. The $V_{SYNC}$ signal resets the system every time the $V_{SYNC}$ signal pulses. $V_{CLK}$ is a clock pulse that corresponds to a high frequency multiple of the $V_{SYNC}$ pulse. Where $V_{CLK}$ is 1024 times faster than $V_{SYNC}$, the output of the system ($V_{SIG1}$) will have 1024 steps in the output waveform before the system is reset.

Controlled Signal Generator Circuit

The operation of the controlled signal generator circuit shown in FIG. 2 will be described as follows below.

While the $V_{SYNC}$ pulse is high, switch $S_1$ couples node 1 to a voltage $V_{START}$, and capacitor $C_{ACC}$ charges up to the starting voltage $V_{START}$. The starting voltage ($V_{START}$) determines the maximum operating voltage of the system. Thus, the starting voltage ($V_{START}$) should be optimized to provide a maximum dynamic range to the signal $V_{SIG}$. At the trailing edge of the $V_{SYNC}$ pulse, capacitor $C_{ACC}$ will have a voltage $V_{START}$ stored thereon, switch $S_1$ will disconnect from $V_{START}$, and switch $S_1$ will couple node 1 to node 4. $C_{ACC}$ has an appropriate value such that it charges up to $V_{START}$ in a time period significantly shorter than the $V_{SYNC}$ pulse, yet retains its stored voltage without drooping (depleting the stored charge over time) for the period of $V_{CLK}$.

At the end of the $V_{SYNC}$ pulse, capacitor $C_{ACC}$ is initialized to $V_{START}$, and buffer BUFF provides an identical voltage to the output ($V_{SIG1}$). The voltage at node 2 ($V_{SIG2}$) is the voltage at the output less a small delta ($V_{DEL}$) determined by the value of $R_{STEP}$ and $I_{STEP}$. Since $I_{STEP}$ may source or sink current, the voltage at node 2 ($V_{SIG2}$) may be greater or less than the voltage at the output of the buffer ($V_{SIG1}$). The step voltage in the output waveform is this a function of the programmable and variable current source ($I_{STEP}$).

Switch $S_2$ couples node 3 to node 2 when $V_{CLK}$ pulses high. During the $V_{CLK}$ pulse, capacitor $C_{STEP}$ charges to the voltage presented at node 2 ($V_{SIG2}$). After the trailing edge of the high pulse of $V_{CLK}$, switch $S_2$ couples node 3 to node 4. When node 3 and node 4 are coupled together, the capacitors ($C_{STEP}$ and $C_{ACC}$) share their energy (neglecting any energy lost due to the resistance of the switches, should be low). Where $C_{ACC}$ is a considerably larger capacitor than $C_{STEP}$, and the step voltage ($V_{DEL}$) is small in comparison to the voltage across capacitor $C_{ACC}$, the resulting voltage is approximately given by:

$$V_{n+1} = V_n * \left\{ 1 + \left( \frac{C_{STEP}}{C_{ACC} + C_{STEP}} \right) * \left( \frac{V_{DEL}}{V_n} \right) \right\} \quad (I)$$

where $V_{DEL} = R_{STEP} * I_{STEP}$, $V_n$ is the voltage across $C_{ACC}$ before the $n^{th}$ transition of $V_{CLK}$, and $V_{n+1}$ is the voltage across $C_{ACC}$ after the $n^{th}$ transition of $V_{CLK}$.

When $I_{STEP}$ is a constant value, the resulting step voltage ($V_{DEL}$) is also a constant. Thus, a constant step voltage in conjunction with equally time spaced clock pulses ($V_{CLK}$) results in an output voltage ($V_{SIG1}$) that is a ramping waveform, where the ramp increases by ($V_{DEL}$) with every subsequent clock pulse. The rate of the ramping waveform depends upon the size of $V_{DEL}$, and the frequency and pulse width of the clock signal ($V_{CLK}$).

Although the slope of the output waveform is a function of the clock frequency, the amplitude of the output waveform ($V_{SIG1}$) is independent of the clock frequency. Each time a sync pulse received, the output waveform ($V_{SIG1}$) is reset back to the start voltage ($V_{START}$). The amplitude of the output waveform is determined by the number, N, of clock cycles ($V_{CLK}$) between vertical sync pulses ($V_{SYNC}$), and the size of the step voltage ($V_{DEL}$). Since the amplitude of the output waveform ($V_{SIG1}$) is independent of the clock frequency, a uniform step voltage as described above is ideally suited for display applications where constant amplitude is required.

The amplitude of the output waveform ($V_{SIG1}$) is altered by changing the size of the step voltage ($V_{DEL}$). As described above, the step voltage is adjusted by changing the size of the step current ($I_{STEP}$). Changing the step voltage size also results in changing the slope of the output waveform. However, since the sync pulse ($V_{SYNC}$) periodically resets the output voltage back to $V_{START}$, a change in the step voltage ($V_{DEL}$) does not change the DC starting voltage. In vertical deflection systems it is preferred to keep the midpoint voltage ($V_{MID}$) of the output waveform at a predetermined constant value when varying the peak-to-peak amplitude (p–p) of the output. A circuit shown in FIG. 3 provides a fixed midpoint voltage for the output voltage ($V_{OUT}$).

Midpoint Voltage Centering Circuit

Figure 3:
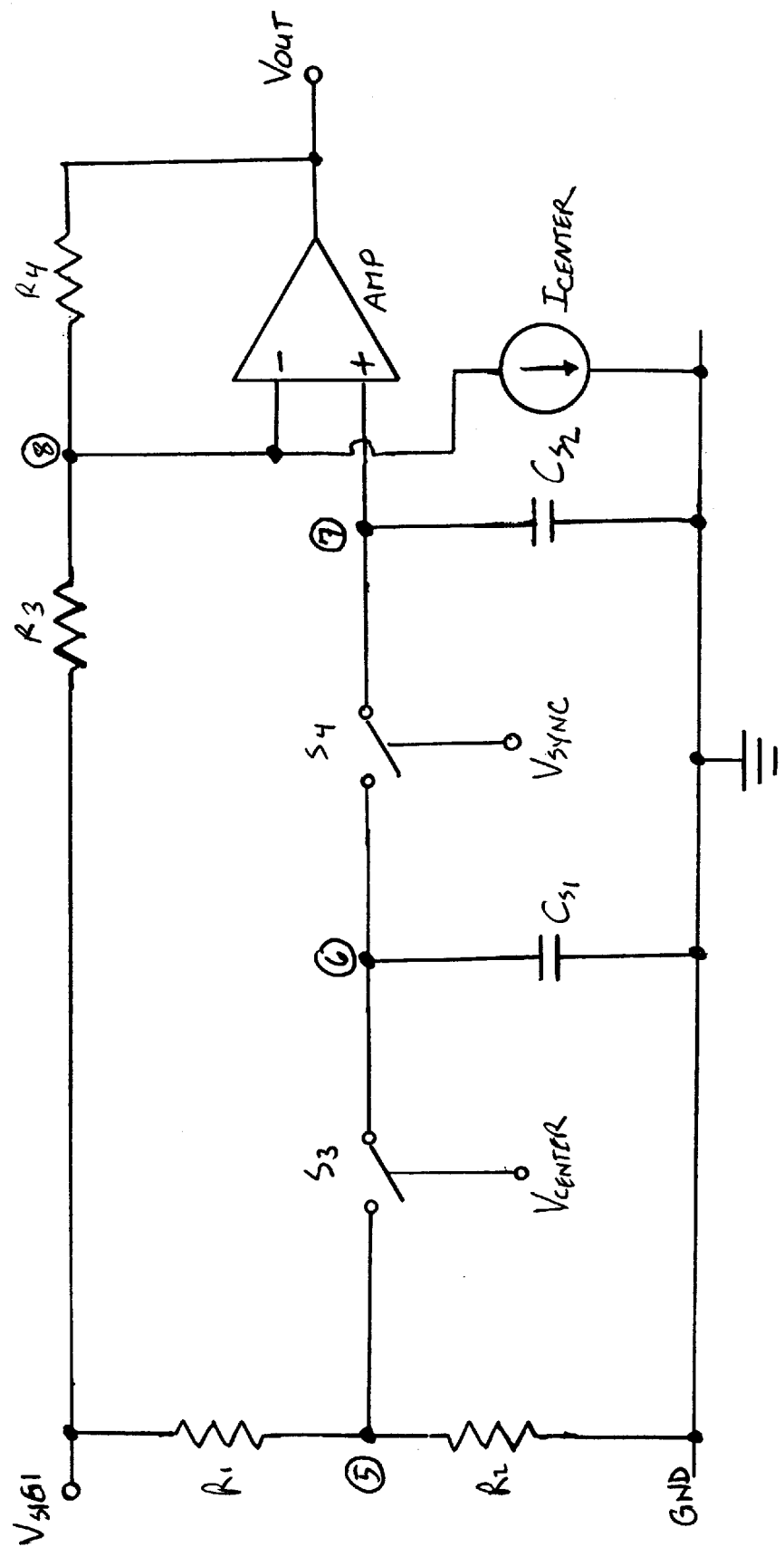
FIG. 3 is a diagram of a voltage centering circuit.

As shown in FIG. 3, the input signal ($V_{SIG}$) is coupled to a circuit including a differential amplifier (AMP, shown as an op-amp). The amplifier (AMP) is configured with a negative input terminal (inverting input) coupled to node 8, a positive input terminal (non-inverting input) coupled to node 7, and an output terminal coupled to $V_{OUT}$. A first resistor ($R_1$) and a second resistor ($R_2$) are series connected between $V_{SIG1}$ and $G_{ND}$, with a common connection at node 5. A first controlled switch ($S_3$) is connected between node 5 and node 6, has a control input coupled to a first control line ($V_{CENTER}$), is arranged such that node 5 is coupled to node 6 when $V_{CENTER}$ is high and isolates node 5 from node 6 when $V_{CENTER}$ is low. A second controlled switch ($S_4$) is connected between node 6 and node 7, has a control input coupled to a second control line ($V_{SYNC}$), is arranged such that node 6 is coupled to node 7 when $V_{CENTER}$ is high and isolates node 6 from node 7 when $V_{CENTER}$ is low. A first storage capacitor ($C_{S1}$) is coupled between node 6 and ground. A second storage capacitor ($C_{S2}$) is coupled between node 7 and ground. A third resistor ($R_3$) and a fourth resistor ($R_4$) are series connected between $V_{OUT}$ and $V_{SIG1}$, with a common connection at node 8. A programmable current source ($I_{CENTER}$) is coupled between node 8 and $G_{ND}$.

The operation of the circuit shown in FIG. 3 will be described as follows below.

In FIG. 3, the periodic signal $V_{SYNC}$ is the same as that described above with reference to FIG. 2. $V_{SIG1}$, in FIG. 3, is a signal such as the output signal ($V_{SIG1}$) described with reference to FIG. 2. The signal $V_{CENTER}$ is a pulse having the same pulse width as one clock pulse from $V_{CLK}$ described with reference to FIG. 1 and a period equal to $V_{SYNC}$. To provide a fixed midpoint voltage for $V_{OUT}$, $V_{CENTER}$ is phased to trigger halfway through the period of the vertical sync pulse (i.e. Where $V_{CLK}$ has N counts between $V_{SYNC}$ pulses, $V_{CENTER}$ will trigger at a count of N/2).

Resisters $R_1$ and $R_2$ form a voltage divider at node 5, dividing the input signal ($V_{SIG1}$) in half when the resistors are of equal value. Since the input signal ($V_{SIG1}$) is usually provided from the output of a buffer, as in FIG. 2, the resistor values should be sufficiently high to prevent excessive loading on the buffer (e.g. $R_1 = R_2 = 10_K$). $V_{CENTER}$ pulses high halfway through the vertical refresh cycle (see above), closing switch $S_3$ and coupling node 5 to node 6. While $V_{CENTER}$ is high, the first storage capacitor ($C_{S1}$) will store charge until the voltage at node 6 reaches the voltage at node 5 (½$V_{SIG1}$, for $R_1 = R_2$). $V_{SYNC}$ pulses high at the beginning of the vertical retrace period, closing switch $S_4$ and coupling node 6 to node 7. While $V_{SYNC}$ is high, charge is transferred from the first storage capacity ($C_{S1}$) to the second storage capacitor ($C_{S2}$).

Typically, $C_{S1} = C_{S2}$, $R_1 = R_2$, and $R_3 = R_4$. In the steady state, the stored voltage node 7 will be the same as that at nodes 5 and 6 (i.e. ½$V_{SIG1}$). $V_{SIG1}$, has a maximum amplitude of $V_{MAX}$, a minimum amplitude of $V_{MIN}$, and a midpoint voltage of $V_{MID}$. Since $V_{CENTER}$ will pulse high halfway through the period of $V_{SIG1}$, node 7 will have a voltage of $V_{MID}/2$ stored on the capacitor ($C_{S2}$).

In its normal linear mode of operation, the amplifier will act to equalize the voltages of node 7 and node 8 (assuming the amplifier has very high gain and the error voltage and amplifier offset voltage are negligible). In that case, the voltage at node 8 will also be approximately $V_{MID}/2$, and the current through $R_3$ is found by:

$$I_{R3} = \left(V_{SIG1} - \left(\frac{V_{MID}}{2}\right)\right) * \left(\frac{1}{R_3}\right)$$

Using Kirchoff's law, the current in R4 is found by $$I_{R4} = \left[\left(V_{SIG1} - \left(\frac{V_{MID}}{2}\right)\right) * \left(\frac{1}{R_3}\right)\right] + I_{CENTER}$$

The output voltage can then be found as:

$$V_{OUT} = V_{NODE8} + (I_{R4} * R_4)$$

$$V_{OUT} = \left(\frac{V_{MID}}{2}\right) - \left[\left(V_{SIG1} - \left(\frac{V_{MID}}{2}\right)\right) * \frac{R_4}{R_3}\right] + (I_{CENTER} * R_4)$$

Presuming R3=R4 (an inverting amplifier with unity gain) and R1=R2 (voltage divider with gain of ½), the output voltage for the non-inverting amplifier is:

$$V_{OUT} = V_{MID} - V_{SIG1} + (I_{CENTER} * R_4)$$

It is readily apparent that when the input voltage, $V_{SIG1}$ is at the midpoint voltage $V_{MID}$, the output voltage is given by:

$$V_{OUT} = (I_{CENTER} * R_4)$$

This sets the DC voltage at the output, and even though the signal $V_{SIG1}$ may change in shape or amplitude, the output level remains fixed, set by the value of $I_{CENTER}$ and R4. R4 is usually constant, but $I_{CENTER}$ may be made adjustable to allow variation in the output DC level.

As discussed previously, $C_{S2}$ will eventually charge up to a DC voltage of half the midpoint voltage of the input waveform ($V_{SIG1}$). Thus, for the example of a linear ramp signal swinging between 5 v and 0 v, $C_{S2}$ must charge up to 1.25V. The capacitor may not reach the midpoint voltage immediately, as it relies upon charge being transferred from $C_{S1}$, and may take a few cycles before the DC level of the output voltage ($V_{OUT}$) has stabilized at half the midpoint voltage. Since capacitor $C_{S1}$ must charge to the midpoint, $C_{S1}$ must be sized to an appropriate value such that the capacitor does not take more than a few cycles of $V_{SIG1}$.

Although the voltage centering circuit shown in FIG. 3 has a two stage sample and hold circuit (S1, CS1; S2, CS2), it is understood and appreciated that a single sample and hold stage may be used. Alternatively, more than two sample and hold stages may be employed. When a waveform midpoint is updated in the center of a scan, visible artifacts appear on the display screen. A two stage sampling circuit is advantageous because the second stage switched by the vertical sync minimizes any visible disturbance, as the waveform DC level is then adjusted during the blanked retrace period of the vertical deflection. In designing any sample and hold stage that is used for centering the DC level of the output voltage, care must be exercised to ensure that the waveform midpoint is not updated in the center of a scan.

Initially, the output waveform ($V_{OUT}$) is not centered about the midpoint of the voltage of the waveform. The sample and hold capacitor(s) must first charge up to half of the midpoint input signal level ($V_{MID}/2$) before the output voltage ($V_{OUT}$) stabilizes. A settling time is associated with the midpoint voltage that is a function of the ratio of values for capacitors $C_{S1}$ and $C_{S2}$. When $C_{S1}$ is much larger than $C_{S2}$, the settling time is on the order of one or two cycles of $V_{SYNC}$. If $C_{S1}$ and $C_{S2}$ are equal, then several VSYNC cycles may be necessary before $C_{S2}$ charges up to the appropriate midpoint value.

In the preferred embodiment of the invention, charge sharing between capacitive stages is employed in the circuits in FIGS. 2 and 3. However, it should be apparent that buffer amplifiers to buffer the output voltage of each capacitor may be used to prevent loss of charge from each capacitive stage, and thus allow smaller capacitors to be used, or faster settling times to be achieved.

Shape Control Circuit

Referring again to FIG. 2, the shape of the output waveform ($V_{SIG1}$) is controlled by the current source ($I_{STEP}$) As discussed previously, the voltage across capacitor $C_{ACC}$ is the accumulation of many small steps. The output waveform ($V_{SIG1}$) is the integral of the contributions from the current source ($I_{STEP}$). A constant value of $I_{STEP}$ will result in a linear ramp. However, the step size may be varied to provide other shape waveforms.

For CRT displays, a ramping waveform is required for vertical deflection. However, often times the waveform must be modified to correct for nonlinear characteristics of the display screen. 'S' correction provides for one type of non-linearity correction. Also, CRT displays require a parabolic waveform for East-West Pin Cushion Correction (EWPCC).

Waveform shape control may be achieved by dynamically controlling the current source ($I_{STEP}$) shown in FIG. 2. The controlling waveform source may be from an analog source, such as by feeding back some modified version of the output waveform, or from an alternative waveform source. As a particular example, two circuits of the type described may be used together, the first to provide a linear ramp for deflection. The ramp output waveform of the first could be also used to modulate $I_{STEP}$ of the second circuit, thus creating a parabolic waveform at the output of the second circuit. In this way, two identical circuits can be used to create both vertical rate waveforms required by the display. It is advantageous in the design of an integrated circuit to use two identical functional blocks in this way, as this reduces the design and development time of the integrated circuit.

Figure 4:
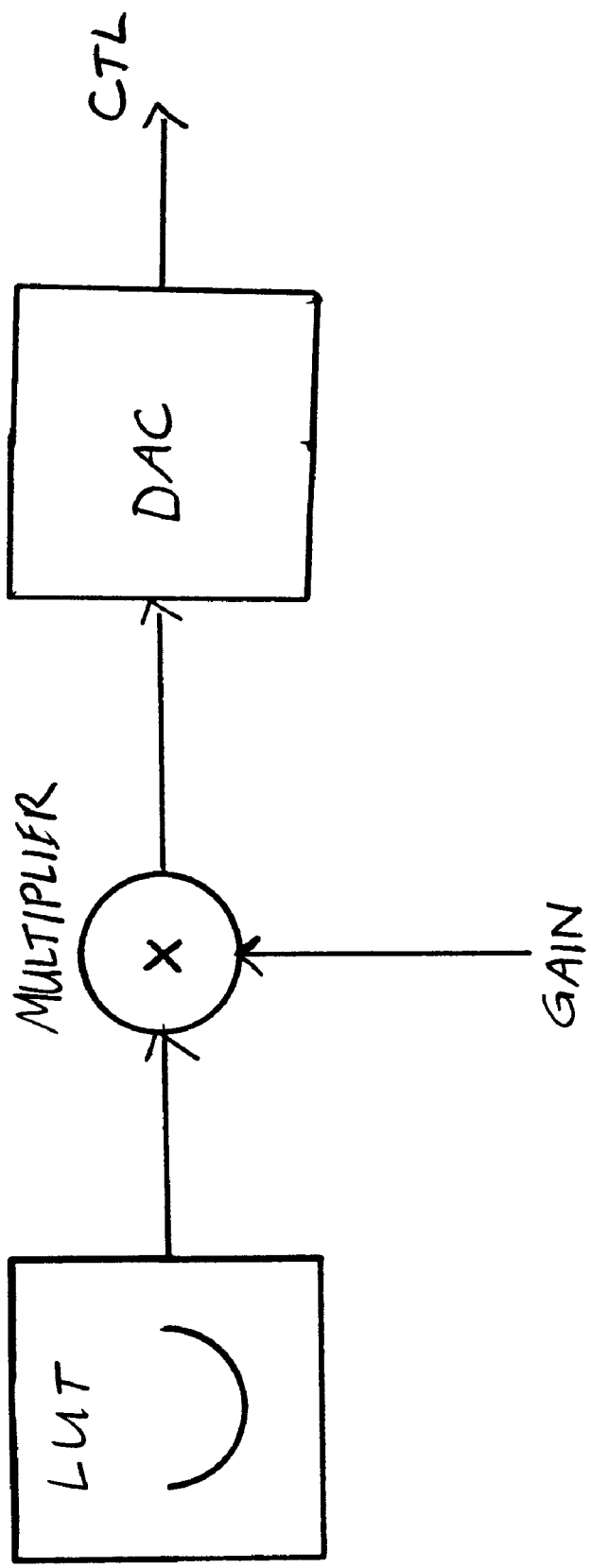
FIG. 4 is a diagram of a wave-shaping control circuit.

An alternative means of modulating the value of ISTEP for waveform shape control is shown in FIG. 4.

As shown in FIG. 4, a look up table (LUT), a multiplier cell and a digital-to-analog converter (DAC) are used to generate a control signal (CTL). The LUT has an output that is coupled to a first input of the multiplier. A second input to the multiplier is coupled to a gain adjustment. The output of the multiplier is coupled to an input of the DAC.

An output of the DAC generates the control signal (CTL), which is coupled to the current source ($I_{STEP}$) in the controlled signal generator circuit shown in FIG. 2. The LUT contains correction factors for the waveform, such as 'S' correction or, pincushion correction or additional corner pincushion correction. The multiplier cell scales the level of the correction factor and drives the input of the DAC. The DAC generates a control signal (CTL) for $I_{STEP}$ such that the resulting output waveform ($V_{SIG1}$) is shaped as linear, S corrected, EWPCC, parabolic or any other desired shape. The DAC may be a current-scaling DAC or voltage-scaling DAC as is necessary to control the current source ($I_{STEP}$).

It is understood and appreciated that the individual circuits shown in FIG. 4 may be combined and modified as is necessary for a particular application. For Example, the multiplier cell and the DAC may be integrated into a single DAC with a gain input, or the gain input may be eliminated if unnecessary. Similarly, the LUT may be part of a digitally controlled system or integrated into the DAC. Similarly, the circuit represented in FIG. 4 may be combined with other analog derived waveforms to provide a composite control of the waveform shape.

In one example of the present invention, the LUT contains parameters that correspond to a parabolic shaped waveform. The waveform could be programmed as 64×6 bit values, twice over-sampled to enhance the effective resolution to 128×7 bit. The LUT provides an economical means of describing the correction waveform.

Example Vertical Deflection Signal Generator System

Figure 5:
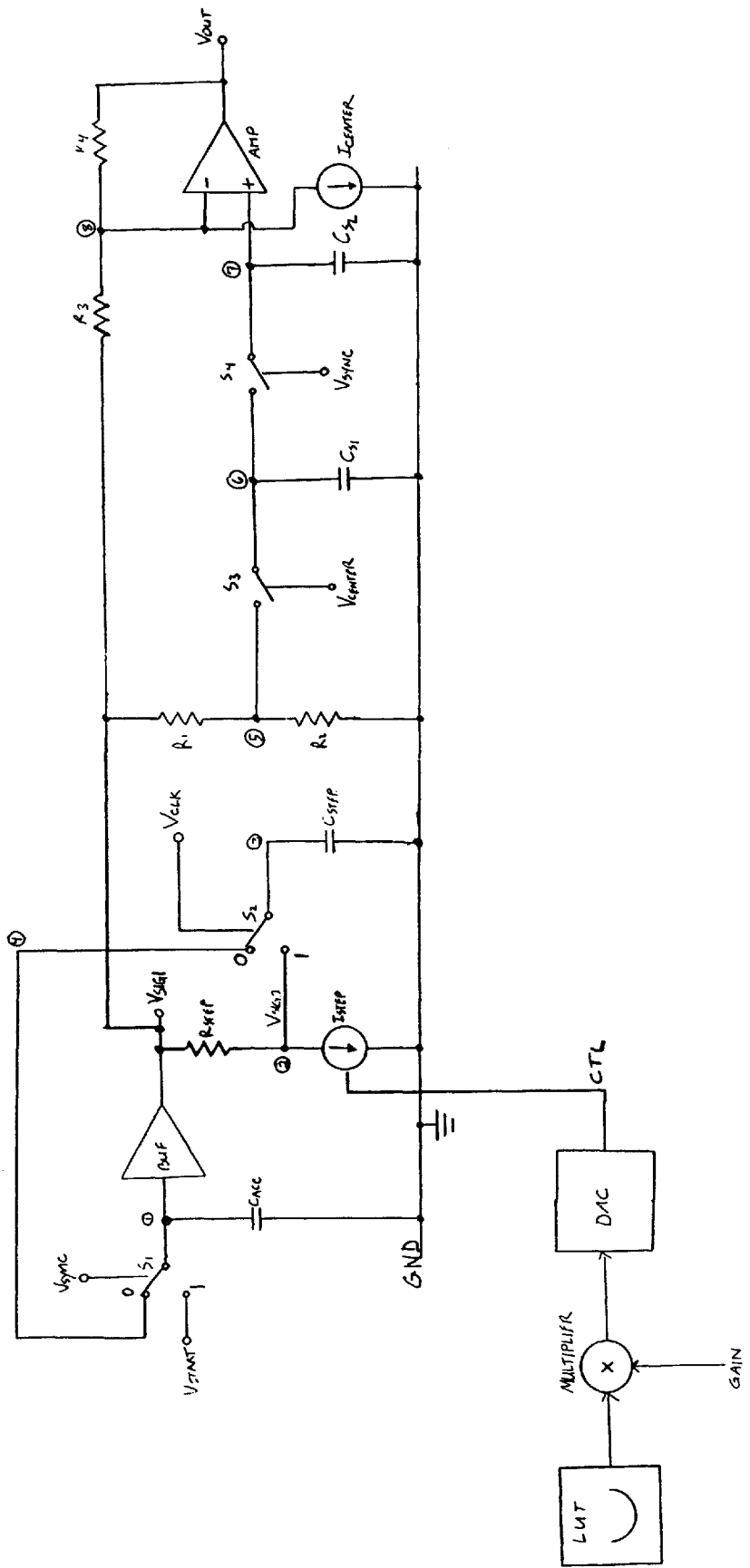
FIG. 5 is a diagram of a vertical deflection signal generator system with wave shape control and a midpoint voltage centering circuit.

In accordance with the present invention, a complete vertical deflection signal generator system is shown in FIG. 5. Waveforms corresponding to the circuit in FIG. 5 are shown in FIGS. 6–9. For these figures, $V_{SYNC}$ pulses every 10 milliseconds and $V_{CLK}$ pulses 1024 times in a 10-millisecond period.

Figure 6:
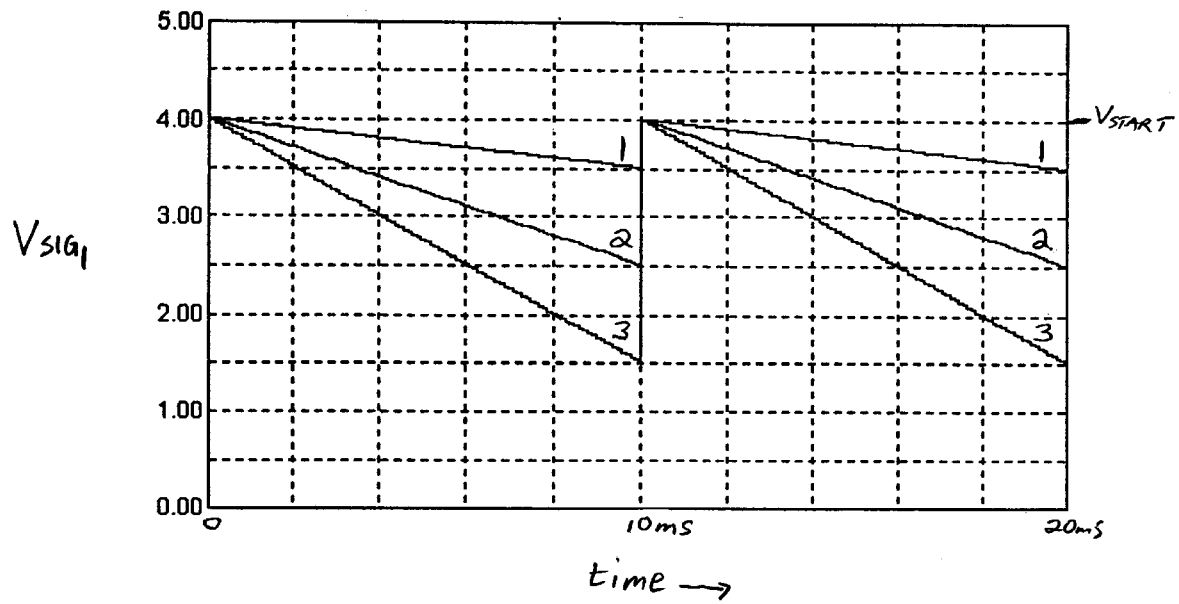
FIG. 6 shows exemplary waveforms for the signal $V_{SIG1}$ shown in FIG. 5.
Figure 7:
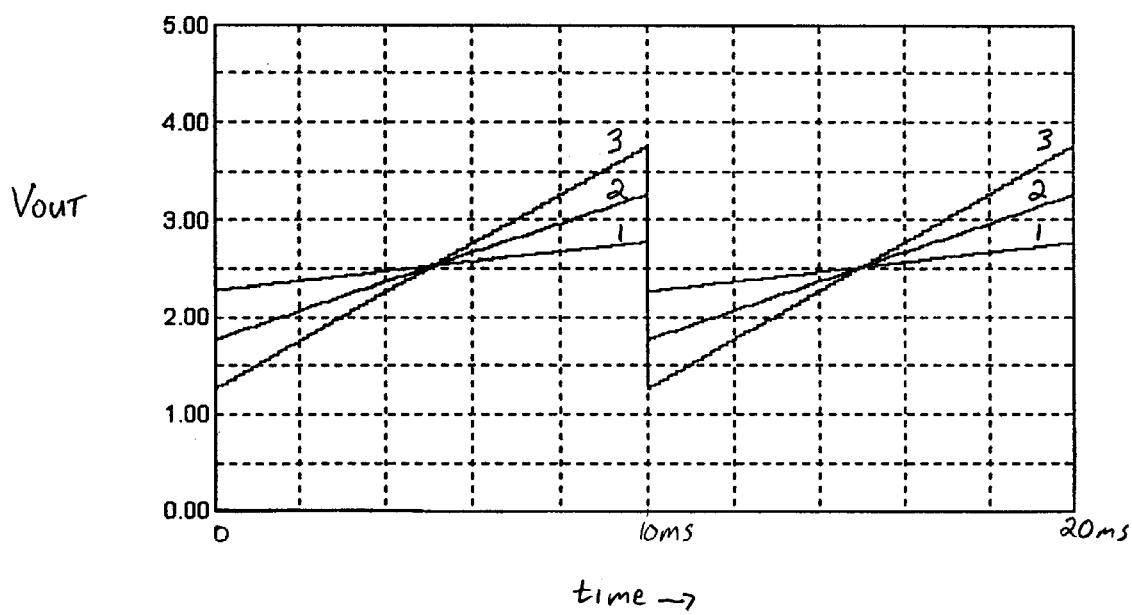
FIG. 7 illustrates exemplary waveforms for the signal $V_{OUT}$ shown in FIG. 5.

FIG. 6 shows ramp waveforms corresponding to $V_{SIG1}$ when the DAC is programmed to provide a fixed control signal (CTL) such that the $I_{STEP}$ is a constant. As shown in the figures, $V_{START}$ is 4.0V, and the peak-to-peak amplitude of the waveform is varied by changing $I_{STEP}$ (shown as waveforms 1, 2 and 3 respectively). FIG. 7 shows the corresponding output ($V_{OUT}$), maintaining a constant mid-point at 2.5V for each output waveform.

Figure 8:
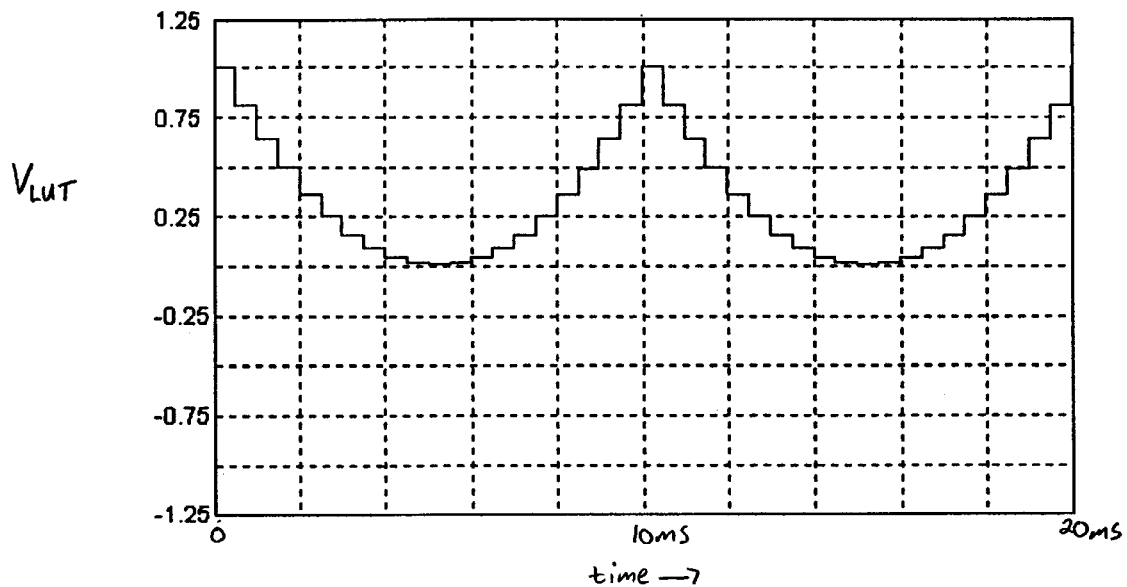
FIG. 8 shows exemplary waveforms for the look up table output for the circuit shown in FIG. 5.
Figure 9:
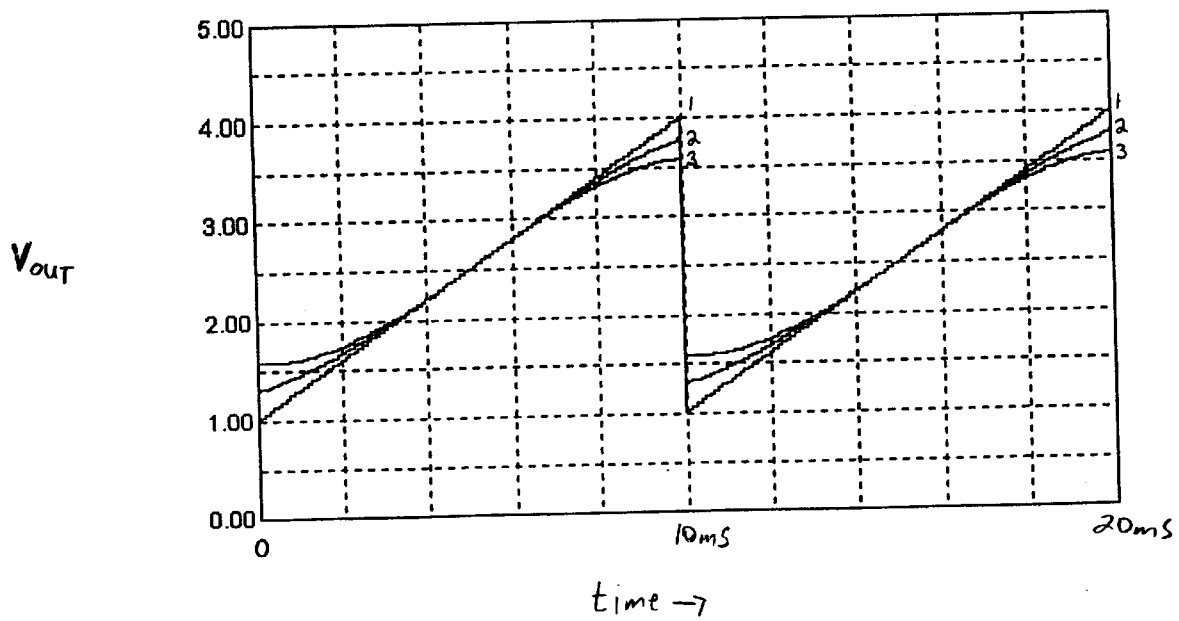
FIG. 9 shows exemplary waveforms for the output signal $V_{OUT}$ shown in FIG. 5.

The output waveform may be corrected using a parabola look up table. FIG. 8 shows the output waveform for the look up table over a 20-millisecond interval (two $V_{SYNC}$ periods). As shown in FIG. 9, application of the parabola look up table results in a symmetric output waveform ($V_{OUT}$) with S linearity correction. By changing the multiplier setting (GAIN), the amount of S correction can be adjusted as shown with waveforms 1, 2 and 3.

Example Vertical Ramp/EWPCC Generator with Corner Correction

Figure 10:
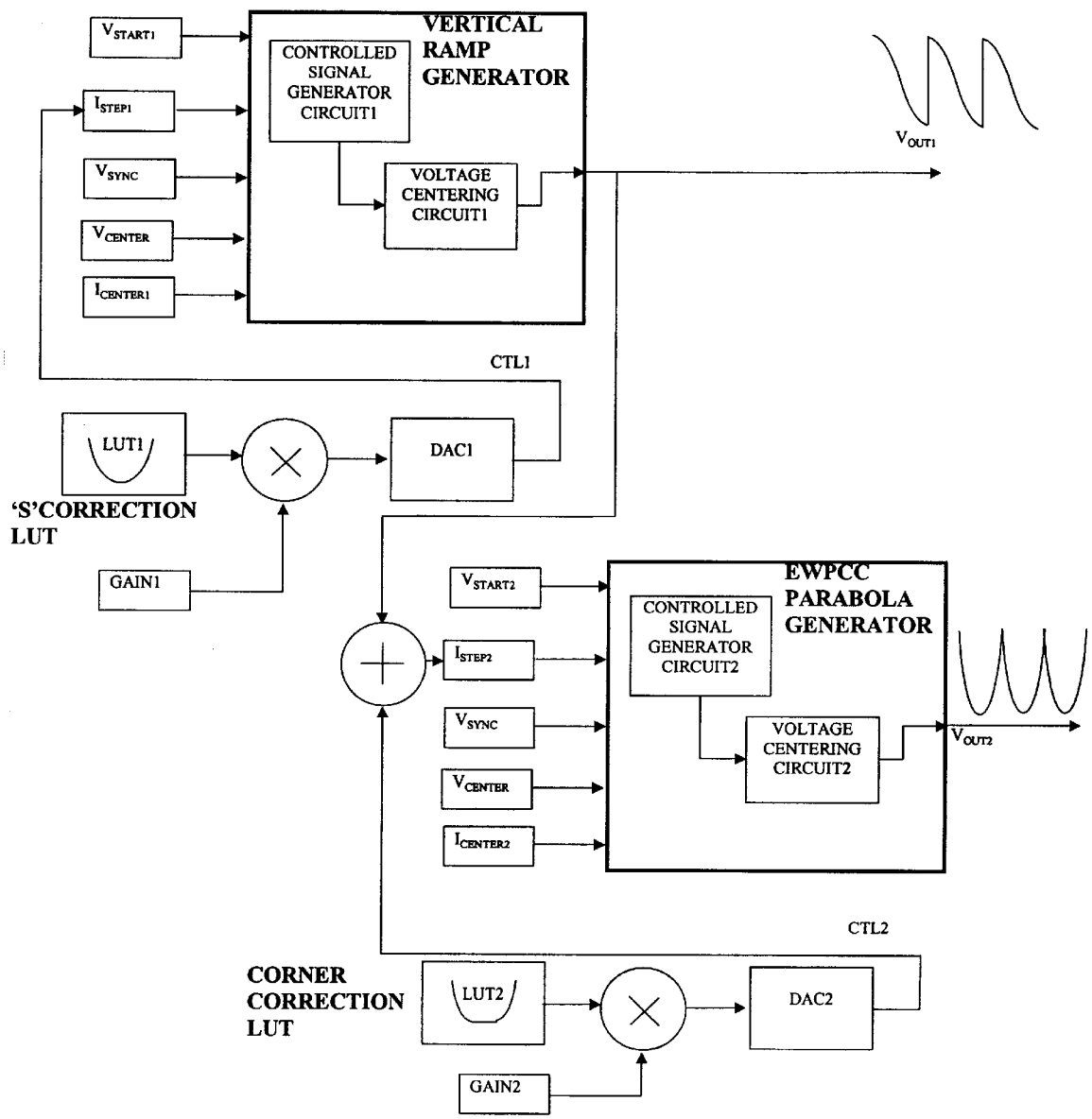
FIG. 10 shows a diagram of a vertical ramp and EWPCC signal generator system with separate wave shape control and midpoint voltage centering circuits.

In accordance with the present invention, an example system for generating vertical rate deflection signals is shown in FIG. 10. The example system includes a vertical ramp generator block and an EWPCC parabola generator block. Each block has separate waveform shape control so that they may be independently adjusted.

The vertical ramp generator circuit includes a controlled signal generator circuit, a voltage centering circuit, and a shape control circuit as shown in FIGS. 1 through 5. The shape control circuit includes a first look up table (LUT1), a first multiplier cell with a first gain setting (GAIN1) and a first DAC (DAC1). As discussed previously in reference to FIG. 4, an output of the DAC generates a control signal that is coupled to a controlled current source such as the controlled signal generator circuit shown in FIG. 2. LUT1 contains correction factors for 'S' correction. The multiplier cell scales the level of the correction factor and drives the input of DAC1. DAC1 generates a first control signal (CTL1) for $I_{STEP1}$ such that the resulting output waveform ($V_{OUT1}$) is shaped as an S corrected ramp function.

The EWPCC parabola generator circuit also includes a controlled signal generator circuit, a voltage centering circuit, and a shape control circuit as shown in FIGS. 1 through 5. The shape control circuit includes a second look up table (LUT2), a second multiplier cell with a second gain setting (GAIN2) and a second DAC (DAC2). LUT2 contains correction factors for corner-correction. The multiplier cell scales the level of the correction factors and drives the input of DAC2.

A parabolic waveform results when the ramp output waveform ($V_{OUT1}$) is used to modulate $I_{STEP2}$. The output of the vertical ramp generator ($V_{OUT1}$) is summed together with the output of DAC2 (CTL2) to generate a control signal for $I_{STEP2}$. By summing together the signals, the resulting output waveform ($V_{OUT1}$) is a parabolic signal that includes higher order correction for corner geometries in the display.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for generating a dynamic signal that is resettable at the start of a period, comprising:
   (a) a first storage circuit stores a first signal thereon, the first signal being initialized to a start value at the start of the period;
   (b) a second storage circuit that stores a second signal thereon;
   (c) a buffer circuit that couples the first signal to a signal output;
   (d) an offset circuit that couples the signal output to another signal output such that the other signal output is different than the signal output by an amount of an offset;
   (e) a control signal that controls the amount of the offset; and
   (f) a switch having a first and second position, the first position couples the other output signal to the second storage circuit, and the second position couples the second signal to the first storage circuit such that the first signal changes over the period and the output signal corresponds to the dynamic signal.

2. An apparatus as in claim 1, wherein the offset circuit includes a current source, the control signal controls the amount of current flowing through the current source, and the amount of current flowing through the current source is proportional to the amount of offset.

3. An apparatus as in claim 1, wherein the output signal is a linear ramp when the control signal is a constant.

4. An apparatus as in claim 1, wherein the output signal is a parabola when the control signal is a bi-directional linear ramp.

5. An apparatus as in claim 1, further comprising:
   (a) a converter that includes an input and an output coupled to the control signal; and
   (b) a look up table that contains values corresponding to a waveform shape, the look up table is coupled to the input of the converter such that the converter generates the control signal in response to the look up table values.

6. An apparatus as in claim 5, wherein the look up table is coupled to the input of the converter through a multiplier circuit having a gain control, such that the converter generates the control signal in response to the look up table values and the gain control.

7. An apparatus as in claim 1, wherein the output signal is shaped by the control signal input such that the output signal is one of a linear ramp signal, an "S" corrected ramp signal, an east-west pin cushion parabolic signal, and a corner correction signal.

8. An apparatus as in claim 1, further including a voltage centering circuit, comprising:
   (a) a third storage circuit that stores a third signal thereon when actuated;
   (b) a center signal that actuates the third storage circuit half way through the period such that the output signal is coupled to the third storage circuit and the third signal corresponds to half of an amplitude of the output signal; and (c) a summing circuit that adds the output signal to the third signal to generate the ramp signal such that the ramp signal is centered about a midpoint voltage.

9. An apparatus as in claim 8, further including another current source that shifts the midpoint voltage.

10. An apparatus as in claim 1, further comprising:

(a) a converter that includes an input and an output;

(b) a look up table that contains values corresponding to a waveform shape, the look up table is coupled to the input of the converter such that the output of the converter generates a first control signal in response to the look up table values; and (c) a summing circuit that adds the first control signal to a second control to generate the control signal such that the control signal modulates the amount of the offset in response to the look up table values and the second control signal.

11. An apparatus as in claim 10, wherein the second control signal is a bi-directional linear ramp such that the modulation of the offset results in a parabolic shaped output signal that includes corrections for corner geometries in a display system.

12. A method for generating a dynamic waveform, comprising:

(a) initializing a first storage circuit having an output such that the output is initialized to a start voltage;

(b) buffering the output of the first storage circuit to produce a signal output;

(c) offsetting the signal output by a controlled amount to produce a second signal output;

(d) storing the second signal output on a second storage circuit to produce a stored signal; and (e) coupling the stored signal to the first storage circuit such that the output signal corresponds to the dynamic waveform.

13. A method for generating a dynamic waveform as in claim 12, further comprising modulating the controlled amount over time such that the dynamic waveform has a varying slope.

14. A method for generating a dynamic waveform as in claim 12, further comprising modulating the controlled with a bi-directional linear ramp signal such that the dynamic waveform has a parabolic shape.

15. A method for generating a dynamic waveform as in claim 12, further comprising:

(a) accessing a look up table to determine a scaling factor; and (b) changing the controlled amount over time based on the scaling factor.

16. A method for generating a dynamic waveform as in claim 12, further comprising:

(a) determining a midpoint value of the signal output; and (b) centering the dynamic waveform based upon the midpoint value of the signal output such that the midpoint value of the dynamic waveform is maintained for varying amplitudes of the signal output.

17. A method for generating a dynamic waveform as in claim 12, further comprising:

(a) sampling the signal output when the signal output is midway through its period to generate a third signal output;

(b) inverting the signal output to generate a fourth signal output; and (c) adding the fourth signal output from the third signal output to generate the dynamic waveform such that the dynamic waveform is centered about a midpoint value.

18. An apparatus for generating a dynamic signal, comprising:

(a) means for sampling a first signal to generate a first stored value;

(b) means for coupling the first stored value to a first output;

(c) means for generating an offset between the first output and a second output;

(d) means for sampling the second output to generate a second stored value; and (e) means for selectively coupling the second stored value to the means for sampling a first signal such that the first stored value changes by an amount corresponding to the offset.

19. An apparatus for generating a dynamic signal as in claim 18, further comprising means for initializing the first signal to a start value.

20. An apparatus for generating a dynamic signal as in claim 18, further comprising means for periodically initializing the first signal to a start value, such that the dynamic signal is reset to the start value at the start of a period.

21. An apparatus for generating a dynamic signal as in claim 18, further comprising means for dynamically varying the offset such that the dynamic signal has a non-uniform slope.

22. An apparatus for generating a dynamic signal as in claim 18, further comprising means for adjusting an amplitude of the dynamic signal by adjusting the offset.

23. An apparatus for generating a dynamic signal as in claim 18, further comprising:

means for dynamically accessing a look up table to produce scaling factors; and means for adjusting the offset based upon the scaling factors.

24. An apparatus for generating a dynamic signal as in claim 18, further comprising means for centering the dynamic signal about a constant midpoint voltage.

25. An apparatus for generating a dynamic signal as in claim 18, wherein the means for generating an offset further includes means for modulating the offset such that the dynamic signal is one of an S corrected ramp signal, a corner corrected signal, and a parabolic signal.

* * * * *